US008748744B2

(12) United States Patent
O'Connor et al.

(10) Patent No.: US 8,748,744 B2
(45) Date of Patent: Jun. 10, 2014

(54) ELECTRICAL BOX EXTENDER ASSEMBLY

(75) Inventors: Douglas P. O'Connor, Richmond, RI (US); Nathaniel L. Herring, Mystic, CT (US)

(73) Assignee: Hubbell Incorporated, Shelton, CT (US)

( * ) Notice: Subject to any disclaimer, the term of this patent is extended or adjusted under 35 U.S.C. 154(b) by 49 days.

(21) Appl. No.: 13/535,997

(22) Filed: Jun. 28, 2012

(65) Prior Publication Data
US 2014/0000925 A1 Jan. 2, 2014

(51) Int. Cl.
*H02G 3/08* (2006.01)
*H02G 3/12* (2006.01)

(52) U.S. Cl.
CPC ............... *H02G 3/08* (2013.01); *H02G 3/121* (2013.01); *H02G 3/086* (2013.01); *H02G 3/081* (2013.01); *Y10S 248/906* (2013.01)
USPC ............... 174/53; 174/50; 174/481; 220/3.2; 220/3.3; 248/906

(58) Field of Classification Search
CPC ......... H02G 3/08; H02G 3/081; H02G 3/086; H02G 3/12; H02G 3/121
USPC ............... 33/480, 481, 50, 53, 57, 58; 220/3.2–3.9, 4.02; 248/906, 909, 343; 439/535, 536, 537; D13/152; 174/480, 174/481, 50, 53, 57, 58
See application file for complete search history.

(56) References Cited

U.S. PATENT DOCUMENTS

| 2,989,206 | A | * | 6/1961 | McAfee | 220/3.7 |
| 3,525,450 | A | | 8/1970 | Payson | |
| 5,012,043 | A | | 4/1991 | Seymour | |
| 5,042,673 | A | | 8/1991 | McShane | |
| 5,117,996 | A | | 6/1992 | McShane | |
| 5,402,902 | A | | 4/1995 | Bouley | |
| 5,931,325 | A | * | 8/1999 | Filipov | 174/57 |
| 5,975,323 | A | | 11/1999 | Turan | |
| 6,017,328 | A | | 1/2000 | Fischell et al. | |
| 6,737,576 | B1 | * | 5/2004 | Dinh | 174/57 |
| 6,858,802 | B2 | | 2/2005 | Hagarty et al. | |
| 7,002,076 | B2 | | 2/2006 | Ungerman et al. | |

(Continued)

OTHER PUBLICATIONS

Hubbell Wiring Systems, Power, Data and A/V Delivery, Flat Panel Connection Enclosure, Oct. 2010, www.hubbell-wiring.com, Shelton, CT.

*Primary Examiner* — Angel R Estrada
(74) *Attorney, Agent, or Firm* — Alfred N. Goodman; Mark S. Bicks

(57) ABSTRACT

An electrical box extender assembly includes an electrical box having four side walls, and a back wall defining a cavity therein. A first of the four side walls of the box includes a first projection extending substantially transversely of the cavity. A substantially tubular extender having a first side wall including a first flange extending transversely thereon, and a tubular base extending transversely thereof. The first flange and tubular base are spaced from one another and a first fastener extends through the first projection, first flange and tubular base to couple the tubular extender to the electrical box.

25 Claims, 4 Drawing Sheets

(56) References Cited

U.S. PATENT DOCUMENTS

| | | |
|---|---|---|
| 7,044,318 B2 | 5/2006 | Gates, II |
| 7,053,301 B2 | 5/2006 | Johnson |
| 7,077,280 B1 * | 7/2006 | Gretz ............................... 174/57 |
| 7,235,739 B2 | 6/2007 | King, Jr. et al. |
| 7,273,982 B1 | 9/2007 | Lalancette |
| 7,294,781 B1 | 11/2007 | Gretz |
| 7,462,775 B1 | 12/2008 | Gretz |
| 7,476,806 B2 | 1/2009 | Dinh |
| 7,531,743 B2 * | 5/2009 | Johnson et al. .................. 174/57 |
| 7,637,385 B2 * | 12/2009 | Wegner et al. .................. 174/57 |
| 7,752,731 B2 | 7/2010 | Lalancette |
| 8,013,243 B2 * | 9/2011 | Korcz et al. ..................... 174/57 |
| 8,245,862 B2 * | 8/2012 | Gates, II ........................ 220/3.8 |
| 2003/0066832 A1 | 4/2003 | Kipka et al. |

\* cited by examiner

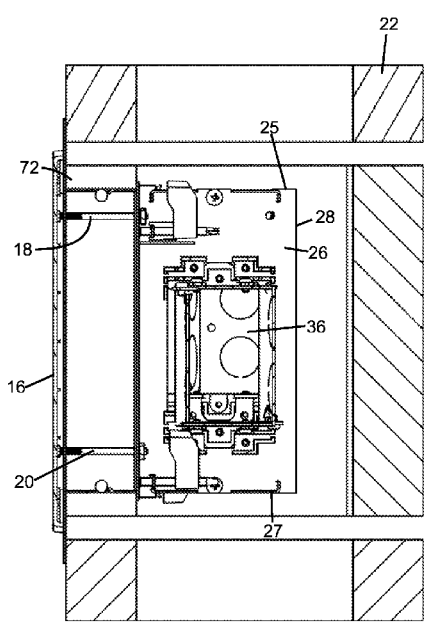 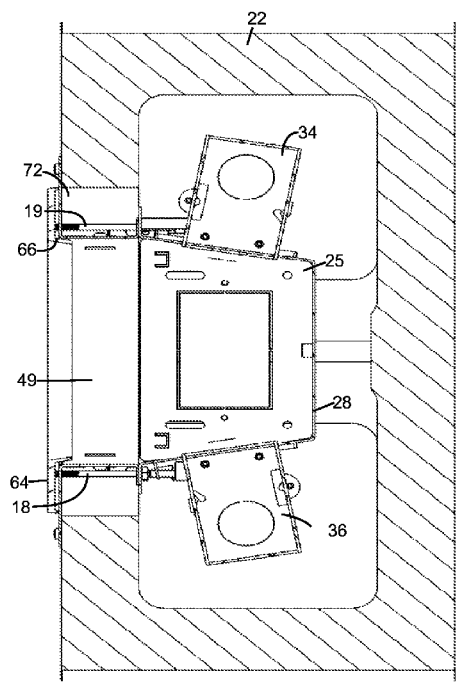
Fig. 2
Fig. 3

ELECTRICAL BOX EXTENDER ASSEMBLY

FIELD OF THE INVENTION

The present invention relates to an electrical box extender assembly for mounting an electrical box within, e.g., a block or concrete wall. More particularly, the invention relates to fastening an electrical box extender onto an electrical box to enable the electrical box to penetrate into a block wall such that utility boxes attached to the exterior of the electrical box are not be impeded by the interior surfaces of the block wall. The electrical box extender assembly includes a cover that engages an outer flange of the extender. The electrical box extender assembly minimizes the number of parts and fasteners used to secure the electrical box, extender and cover together and to mount the assembly onto the wall.

BACKGROUND OF THE INVENTION

Many conventional multimedia outlet boxes are designed to work within the standard depth of a studded interior commercial or residential wall. A studded wall usually includes one or two sheet rock layers having standard thicknesses and studs of standard thicknesses. The conventional multimedia outlet box is generally designed to accommodate installations of multimedia devices and cabling within the standard interior wall depth and sheet rock layer thickness. However, installing a multimedia outlet designed for studded interior walls into a concrete or cinder block wall creates interferences with the wall thickness and would not function properly. The wall thickness of a concrete or cinder block is substantially greater than the thickness of a conventional studded interior wall.

Many attempts have also been made to extend the depth or thickness of an electrical outlet box by adding an extension bracket or clamp. However, these extension devices often require many additional fasteners and holes drilled or otherwise created in the housing of the outlet box. The use of these additional fasteners and corresponding holes, add additional cost and complexity to the assembly and mounting of these outlet boxes.

Examples of these prior electrical outlet box extension devices are disclosed in the following U.S. Pat. No. 5,042,673 to McShane and U.S. Pat. No. 7,476,806 to Dinh.

Thus, there is a continuing need to provide improved electrical box extenders.

SUMMARY OF THE INVENTION

Accordingly, it is a primary object of the embodiments of the invention to provide an electrical box extender capable of increasing the depth of an electrical box secured within a wall.

A further object of the embodiments of the invention is to reduce the number of parts and fasteners needed to extend the electrical box.

The foregoing objectives are basically attained by an electrical box assembly that includes an electrical box having four side walls, and a back wall defining a cavity therein, a first of the four side walls including a first projection extending substantially transversely of the cavity; a substantially tubular extender having a first side wall including a first flange extending transversely thereon, and a tubular base extending transversely thereof, the first flange and tubular base being spaced from one another; and a first fastener extending through the first projection, the first flange and the tubular base to couple the tubular extender to the electrical box.

The foregoing objectives are also attained by an electrical box assembly that includes an electrical box having a plurality of side walls and a back wall defining a cavity therein, a first of the plurality of side walls including a first projection extending transversely of the cavity, a substantially tubular extender having a plurality of side walls, a first of the plurality of side walls including a first flange extending transversely from the first side wall and a tubular base extending transversely from the first side wall, and a first fastener extending through the first projection of the first of the plurality of side walls of the electrical box and the first flange and tubular base of the tubular extender to couple the tubular extender to the electrical box.

The foregoing objectives are further attained by an electrical box assembly including an electrical box having four side walls, and a back wall defining a cavity therein, a first of the four side walls including a first projection extending substantially transversely of said cavity and a second of said four side walls including a second projection extending substantially transversely from the cavity; a substantially tubular extender having a first flange extending transversely thereon, and a tubular base extending transversely thereof, the first flange and the tubular base being spaced from one another in a longitudinal direction with respect to the tubular extender, and the tubular extender also having a second flange extending transversely thereon, the first flange and said second flange being spaced from one another in a lateral direction with respect to the tubular extender; a first fastener, extending through the first projection of the first of the four side walls of the electrical box and the first flange and the tubular base of the tubular extender; and a second fastener, extending through the second projection of the second of the four side walls of the electrical box and the second flange and the tubular base of the tubular extender to couple the extender to the electrical box.

Other objects, advantages and salient features of the embodiments of the invention will become apparent from the following detailed description, which, taken in conjunction with the annexed drawings, discloses a preferred embodiment of the invention.

BRIEF DESCRIPTION OF THE DRAWINGS

The above benefits and other advantages of the various embodiments of the present invention will be more apparent from the following detailed description of an exemplary embodiment of the present invention and from the accompanying drawing figures, in which:

FIG. 2 is a side view of the electrical box extender assembly of FIG. 1, mounted within a block wall;

FIG. 3 is a top view of the electrical box extender assembly of FIG. 1;

DETAILED DESCRIPTION OF THE EXEMPLARY EMBODIMENT

Throughout the drawings, like reference numbers will be understood to refer to like parts, components and structures.

Figure 7:
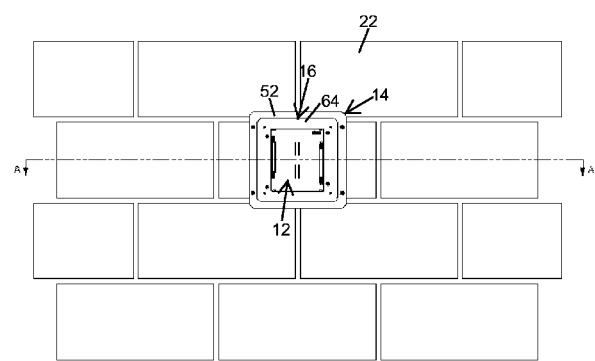
FIG. 7 is a front view of the electrical box extender assembly of FIG. 1, mounted to a block wall.

As shown in FIGS. 1-7, an electrical box extender assembly 10 in accordance with an embodiment of the invention includes an electrical box 12, a tubular extender 14 and a cover 16. The electrical box 12, extender 14 and cover 16 are advantageously secured together by a minimum number of fasteners 18-21 (bolts, screws or other known fasteners) with corresponding nuts 18a-21a, which reduces material, manufacturing and assembly costs. As shown in FIGS. 2, 3 and 7, the electrical box extender assembly 10 can be mounted and secured within a block wall 22, typically formed of concrete or cinder blocks.

The electrical box 12 includes a plurality of substantially planar side walls 24-27 and a substantially planar back wall 28 defining an internal cavity 29, as shown in FIGS. 1-5. Side walls 24 and 26 can include rectangular access openings 30 and 32, respectively, which can typically engage and support utility boxes 34 and 36, respectively. Utility or junction boxes 34 and 36 can be secured to electrical box 12 via any desirable fastener, snap-in engagement or other fastening mechanism known in the art. Thus, when the electrical box 12 is recessed within the block wall 22, the cavity 29 can be accessible from a location exterior to the block wall 22, enabling, for example, multimedia cables to extend from a location outside of block wall 22 to utility boxes 34 and 36.

Figure 1:
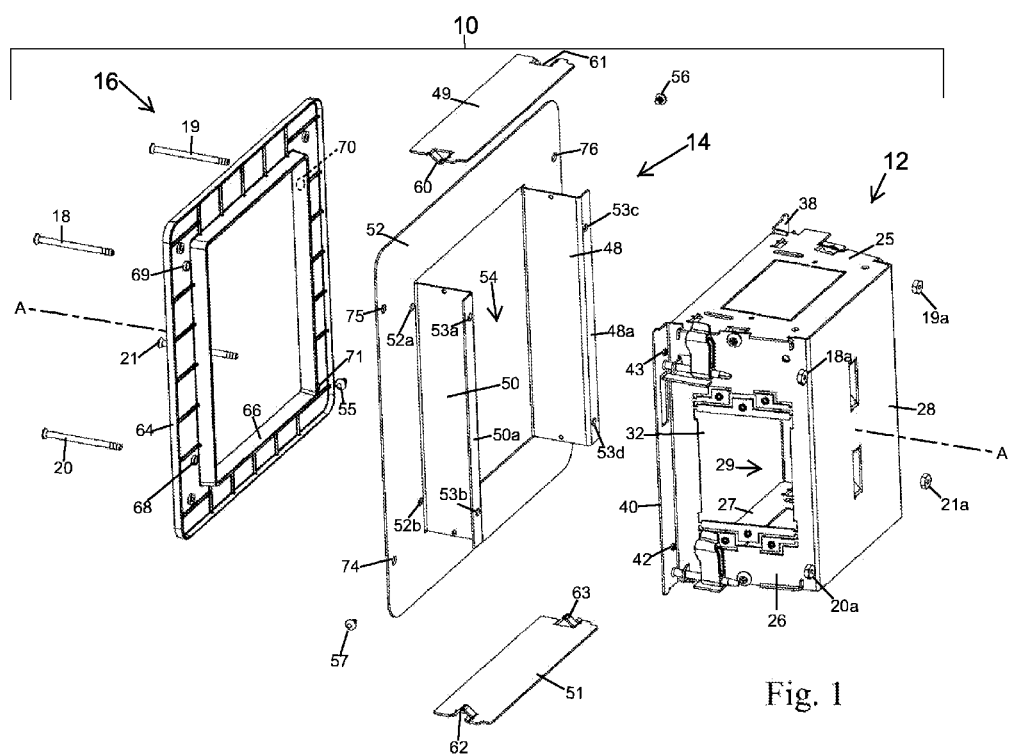
FIG. 1 is an exploded rear perspective view of an electrical box extender assembly, including adjoining utility boxes, according to an exemplary embodiment of the present invention.

Side walls 24 and 26 also include projections 38 and 40, respectively, which extend transversely from the cavity 29. Projections 38 and 40 are substantially planar and coplanar to one another and substantially parallel to the back wall 28. As shown in FIG. 1, projection 40 includes through holes 42 and 43 configured to mate with screw fasteners 21 and 18, respectively. Holes 42 and 43 are positioned on substantially opposite ends of projection 40 and substantially identical holes 44 and 45 are formed in projection 38 and are configured to similarly mate with screw fasteners 19 and 20.

The tubular extender 14 includes a plurality of substantially planar side walls 48-51 forming a substantially tubular extension. Each of the side walls 48-51 is positioned at a substantially 90 degree angle with respect to an immediately adjacent side wall. Side walls 48 and 50 are substantially parallel to one another and are formed as a single unitary-piece with an outer flange 52 which lies on a plane substantially perpendicular to side walls 48 and 50. Side walls 48 and 50 are also formed as a single unitary-piece with flanges 48a and 50a, respectively. Flanges 48a and 50a are generally co-planar and substantially parallel to tubular base 52 and tubular base 52 extends a greater distance from a central longitudinal axis A than flanges 48a and 50a, creating a substantially planar tubular base 52 having a greater surface area to engage a front surface of the wall 22 during mounting of the electrical box extender assembly 10. Tubular base 52 has a substantially rectangular outer perimeter including holes 52a-52d, and advantageously completely surrounds a substantially rectangular access opening 54, although it does not always have to completely surround the opening 54 but just substantially surround the opening 54.

Side walls 49 and 51 are substantially parallel to one another and are secured to adjacent side walls 48 and 50 via bolts 55-58, screws or other fasteners commonly known in the art. Specifically, side walls 49 and 51 include fastener receiving portions 60-63 that can receive respective bolts 55-58. Bolts 55-58 can thereby secure side walls 49 and 50 to side walls 48 and 50, forming a generally tubular extension, further defining the access opening 54 and having a substantially rectangular cross-section.

The cover 16 is formed as a single unitary-piece having a generally planar perimeter flange 64 and an integral inner tubular extension 66. The tubular extension 66 extends transversely from the perimeter flange 64 in a substantially perpendicular direction. The perimeter flange 64 also includes holes 68-71 formed to receive screw fasteners 18-21, but may include fewer or additional holes according to a desired securing configuration. The cover 16 may be manufactured as a molded plastic, metal or other material commonly used in electrical box cover applications.

Assembly

Figure 4:
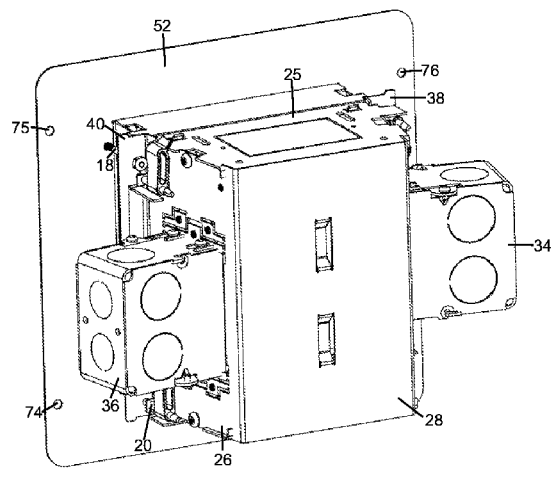
FIG. 4 is a rear perspective view (left side) of the electrical box extender assembly, including utility boxes.
Figure 5:
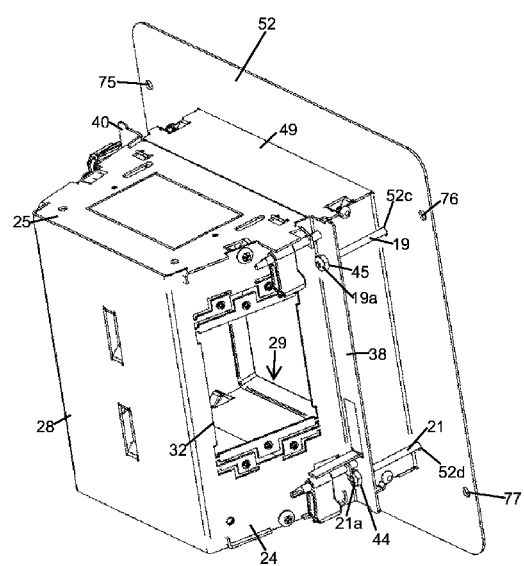
FIG. 5 a rear perspective view (right side) of the electrical box extender assembly, excluding adjoining utility boxes.
Figure 6:
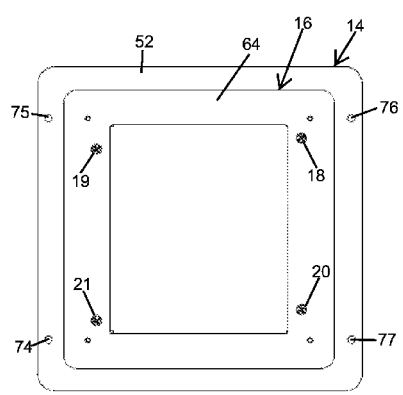
FIG. 6 is a front view of a cover and extender of the electrical box extender assembly of FIG. 1.

The electrical box extender assembly 10 is constructed by connecting the various parts shown in FIGS. 1 and 4. As seen in FIGS. 2-5, electrical box 12, tubular extender 14 and cover 16 are fully assembled and utility boxes 34 and 36 are secured to electrical box 12. The fully assembled electrical box 12 and tubular extender 14 are secured within block wall 22 so that utility boxes 34 and 36 are not impeded by and do not contact the interior surfaces of the block wall 22.

During the first step of assembly, side walls 49 and 51 are secured to side walls 48 and 50 via bolts 55-58, respectively. Bolts 55-58 extend through respective fastener receiving portions 60-63 and respective side walls 48-51, securing side walls 48-51 to immediately adjacent side walls 48-51, as seen in FIG. 1.

Second, the tubular extender 14 is mated with the electrical box 12 by abutting flanges 48a and 50a of the tubular extender 14 with projections 38 and 40 of the electrical box 12. The mating of the electrical box 12 and the tubular extender 14 coaxially aligns the access opening 54 of the tubular extender 14 and the cavity 29 of the electrical box 12 about the central axis A.

Third, cover 16 is engaged with the tubular extender 14 by inserting the tubular extension 66 into the extension opening 54, thereby coaxially aligning the tubular extension 66 with the access opening 54 about the central axis A, as seen in FIG. 3. The perimeter flange 64 of the cover 16 also engages the tubular base 52 of the tubular extender 14 providing a decorative cover or shield-like protection to tubular base 52 which would otherwise be exposed and visible on the outer surface of the wall 22. However, tubular base 52 is wider than the perimeter flange 64 of the cover 16 and extends further from the central axis A, providing greater stability to the electrical box extender assembly 10 when mounted to wall 22.

Fourth, fasteners 18-21 pass through respective holes 68-71 of the cover 16, holes 52a-52d of tubular base 52 and holes 53a-53d of flanges 48a and 50a of the tubular extender 14, and holes 42-45 of the electrical box 12. Thus, fasteners 18-21 secure the electrical box 12, tubular extender 14 and cover 16 together, forming the electrical box extender assembly 10. This configuration is advantageous because there is no need for additional fasteners or steps to secure each of the parts together.

Additionally, utility boxes 34 and 36 may be attached to the electrical box 12 at the access openings 30 and 32 via any desired fasteners known in the art, by snap-fit or another desired fastening mechanism. The utility boxes 34 and 36 can also be covered by interface plates (not shown) on an inside surface of the electrical box 12. These interface plates can include various data and electrical ports.

Fifth, the fully assembled electrical box extender assembly 10 can be inserted into wall opening 72 such that the electrical box 12 and the tubular extender 14 are received within the opening 72 and the tubular base 52 of the tubular extender 14 overlaps the outer surface of the wall 22.

Sixth, additional fasteners (not shown) extend through holes 74-77 of the outer flange 52 of the electrical box extender 14 and into the wall 22. These fasteners can penetrate and anchor into cinderblock, concrete, wood or other material commonly known in the art. Alternatively, holes may be predrilled into the wall 22 and the fasteners can extend through the holes and be anchored on an interior surface of the wall 22 via a nut or other similar anchoring device commonly known in the art. These fasteners secure the electrical box assembly 10 to the wall 22. Once the electrical box assembly 10 is secured to the wall 22, a user can gain access to the utility boxes 34 and 36 from outside the wall 22 via the access opening 54 and the cavity 29 within the electrical box 12.

While an advantageous embodiment has been chosen to illustrate the invention, it will be understood by those skilled in the art that various changes and modifications may be made therein without departing from the scope of the invention as defined in the appended claims.

The foregoing embodiments and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims.

What is claimed is:

1. An electrical box assembly comprising:
an electrical box having four side walls, and a back wall defining a cavity therein, a first of said four side walls including a first projection extending substantially transversely of said cavity and extending substantially perpendicular to said side wall;
a substantially tubular extender having a first side wall having a first longitudinal end including a first flange extending transversely from said first side wall, and a base extending transversely from a second longitudinal end of said side wall and overlying and substantially parallel to said first flange and said projection, said first flange and base being spaced longitudinally from one another; and
a first fastener extending through said first projection, said first flange and said base to couple said tubular extender to said electrical box.

2. The electrical box assembly of claim 1, wherein said first projection of said first of said four side walls of said electrical box is substantially parallel to said first flange and said base of said tubular extender.

3. The electrical box assembly of claim 1, wherein said first projection of said first of said four side walls of said electrical box substantially abuts said first flange of said tubular extender.

4. The electrical box assembly of claim 1, wherein a second of said four side walls of said electrical box includes a second projection extending transversely thereof and is substantially opposed to said first side wall of said electrical box, and
further including a second side wall of said tubular extender includes a second flange extending from said second side wall, and said base extending from said second side wall.

5. The electrical box assembly of claim 4, and further comprising a second fastener extending through said second projection of said second side wall of said electrical box, said second flange of said second side wall of said tubular extender and said base.

6. The electrical box assembly of claim 4, wherein said base of said tubular extender is substantially planar.

7. The electrical box assembly of claim 1, further comprising
a cover having an outer perimeter flange and secured to said tubular extender via said first fastener extending through said outer perimeter flange.

8. The electrical box assembly of claim 1, wherein said first projection of said first side wall of said electrical box is substantially parallel to said first flange and said base of said tubular extender.

9. The electrical box assembly of claim 1, wherein said tubular extender has a longitudinal axis A, and said base extends outwardly a greater distance from said longitudinal axis A than said first flange of said first side wall of said tubular extender.

10. The electrical box assembly of claim 1, wherein said first projection extends outwardly from said first side wall of said electrical box, and
said first flange and base extend outwardly from said first side wall of said extender.

11. The electrical box assembly of claim 1, wherein said first side wall of said electrical box has a front edge, and said first projection extending outwardly from said front edge and said electrical box.

12. An electrical box assembly comprising:
an electrical box having a plurality of side walls and a back wall defining a cavity therein, a first of said plurality of side walls including a first projection extending outwardly from said first side wall and said cavity,
a substantially tubular extender having a plurality of side walls, a first of said plurality of side walls including a first flange extending transversely from said first side wall and aligned with said first projection and a base extending transversely from said first side wall and aligned with said first flange and the projection, and
a first fastener extending through said first projection of said first of said plurality of side walls of said electrical box and said first flange and base of said tubular extender to couple said tubular extender to said electrical box.

13. The electrical box assembly of claim 12, wherein said electrical box and said tubular extender include coaxial longitudinal axes, wherein said first projection of said first side wall of said electrical box and said first flange and said base of said tubular extender are substantially perpendicular to and extend outwardly from said longitudinal axes of said electrical box and said tubular extender.

14. The electrical box assembly of claim 12, wherein said first projection of said first side wall of said electrical box substantially abuts said first flange of said tubular extender.

15. The electrical box assembly of claim 12, wherein said first projection extends outwardly from said first side wall of said plurality of sidewalls of said electrical box.

16. The electrical box assembly of claim 15, wherein said first flange and said base extend outwardly from said first side wall of said plurality of sidewalls of said tubular extender.

17. The electrical box assembly of claim 12, wherein said first projection extends outwardly from said first of said plurality of side walls of said electrical box, said first side wall of said tubular extender having a first longitudinal end with said first flange extending outwardly from said first longitudinal end, and said first side wall of said tubular extender having a second end with said base and extending outwardly from said second longitudinal end.

18. An electrical box assembly comprising:

an electrical box having four side walls, and a back wall defining a cavity therein, a first of said four side walls including a first projection extending substantially transversely of said cavity and a second of said four side walls including a second projection extending substantially transversely of said cavity;

a substantially tubular extender having a first flange at a first longitudinal end extending transversely thereon, and a base extending from a second longitudinal end transversely thereof and overlying said first flange, said first flange and said base overlying said projection and being spaced from one another in a longitudinal direction with respect to said tubular extender, and said tubular extender also having a second flange extending transversely thereon, said first flange and said second flange being spaced from one another in a lateral direction with respect to said tubular extender;

a first fastener, extending through said first projection of said first of said four side walls of said electrical box and said first flange and said base of said tubular extender; and a second fastener, extending through said second projection of said second of said four side walls of said electrical box and said second flange and said base of said tubular extender to couple said extender to said electrical box.

19. The electrical box assembly of claim 18, further comprising a cover having an outer perimeter flange and an inner tubular extension, and secured to said tubular extender via said first and second fasteners extending through said outer perimeter flange.

20. The electrical box assembly of claim 19, wherein said tubular extender defines an access opening, and wherein said tubular extension of said cover extends into said access opening.

21. The electrical box assembly of claim 18, wherein said base of said tubular extender extends a further distance from a central longitudinal axis of said tubular extender than said first flange of said tubular extender.

22. The electrical box assembly of claim 19, wherein said first projection of said first side wall of said electrical box substantially abuts said first flange of said tubular extender, and said base of said tubular extender substantially abuts said outer perimeter flange of said cover.

23. The electrical box assembly of claim 18, wherein said first projection extends outwardly from said first side wall and said second projection extends outwardly from said second end wall, said first flange and base extending outwardly from said extender and overlying said first projection, and said second flange and base extending outwardly from said extender and overlying said second projection.

24. The electrical box assembly of claim 18, wherein said first flange extends outwardly from a first longitudinal end of said first side wall of said extender, said base extends outwardly from a second longitudinal end of said side wall of said extender, and said first projection extending outwardly from said first wall and said second projection extending outwardly from said second wall of said extender.

25. The electrical box assembly of claim 18, wherein said first flange and second flange extending outwardly from said extender and are configured for contacting an inner face of a building wall, and said base extends outwardly from said extender and is configured for contacting an outer face of the building wall.

* * * * *